United States Patent [19]

Wolford et al.

[11] Patent Number: 6,134,620
[45] Date of Patent: Oct. 17, 2000

[54] TRI-STATE BUS CONTENTION CIRCUIT PREVENTING FALSE SWITCHING CAUSED BY POOR SYNCHRONIZATION

[75] Inventors: Barry Joe Wolford; Chau-Shing Hui; Krishnamurthy Venkatramani, all of Austin, Tex.

[73] Assignees: International Business Machines Corporation, Armonk, N.Y.; Motorola, Inc., Schaumburg, Ill.

[21] Appl. No.: 09/052,246

[22] Filed: Mar. 31, 1998

[51] Int. Cl.[7] ..................................................... G06F 13/40
[52] U.S. Cl. ........................ 710/126; 710/131; 710/107; 326/82
[58] Field of Search ..................................... 710/126–129, 710/131, 105, 107, 110, 113, 118; 326/82, 86, 90, 93

[56] References Cited

U.S. PATENT DOCUMENTS

| | | | |
|---|---|---|---|
| 4,504,745 | 3/1985 | Spence et al. | 307/473 |
| 4,617,479 | 10/1986 | Hartmann et al. | 307/465 |
| 4,716,550 | 12/1987 | Flannagan et al. | 365/207 |
| 5,361,005 | 11/1994 | Slattery et al. | 326/56 |
| 5,422,591 | 6/1995 | Rastegar et al. | 327/409 |
| 5,423,030 | 6/1995 | Byers et al. | 395/575 |
| 5,510,729 | 4/1996 | Reymond | 326/33 |
| 5,646,553 | 7/1997 | Mitchell et al. | 326/86 |
| 5,789,944 | 8/1998 | Choy et al. | 326/82 |

*Primary Examiner*—Ayaz R. Sheikh
*Assistant Examiner*—Raymond N Phan
*Attorney, Agent, or Firm*—Casimer K. Salys; Felsman, Bradley, Vaden, Gunter & Dillon, LLP

[57] ABSTRACT

A method of avoiding contention on a communications bus using an improved tri-state driver, which negates one of the internal driver signals during a restore region of the driver cycle, such that the driver cannot switch to the high state when there is poor synchronization that delays one of the internal driver signals. Restoring logic provides a first logic signal and a second logic signal. An input gate is asserted to an active level in response to the first logic signal, and gating logic conditionally enables the input gate in response to the second signal.

11 Claims, 5 Drawing Sheets

TRI-STATE BUS CONTENTION CIRCUIT PREVENTING FALSE SWITCHING CAUSED BY POOR SYNCHRONIZATION

BACKGROUND OF THE INVENTION

1. Field of the Invention

The present invention generally relates to computer systems, and more specifically to a method of eliminating contention between two or more devices which use a common communications medium, particularly a bus for carrying control signals, wherein the devices (microprocessors) use tri-state drivers to avoid bus contention.

2. Description of Related Art

Modern electronic circuits use many different types of logic components (processing units) to carry out numerous functions. These circuits require a multitude of conductive pathways, or buses, to provide communications or connectivity between the logic components. A communications bus (wire) may be used to transmit data such as values used by a computer program, or program instructions, and further may be used to transmit various control signals. Buses can be unidirectional, bidirectional, or broadcast (used to interconnect three or more devices and allow simultaneous or sequential access to information or controls conveyed on the bus). These buses may be external, e.g., laid out on a printed circuit board, and interconnecting two or more devices which are separately packaged. They may also be internal, interconnecting two or more devices which are fabricated in a single package, such as an integrated circuit (IC).

Buses are used to interconnect devices for a wide variety of applications, including communications between complex computer components such as microprocessors, application specific integrated circuits (ASICs), peripheral devices, random-access memory, etc. Operational demands on buses for computer systems have especially increased with the advent of high-speed computer processors, e.g., those operating at frequencies around 100 MHz or more, and especially above 1 GHz. For example, one problem that is exacerbated at these higher speeds is bus contention, which can occur when two or more logic units attempt to simultaneously access a single bus. If two devices simultaneously drive a bus, the transmitted information becomes garbled and unreliable.

One prior art technique for avoiding bus contention is to provide a tri-state driver, that is, a driver which provides inactive (low or zero) and active (high or one) states, as well as providing an intermediate, high-impedance state (Hi-Z). This technique is implemented, for example, in the bus architecture of PowerPC™ microprocessors (PowerPC is a trademark of International Business Machines Corp.). These processors are particularly adapted for use in a symmetric multi-processor (SMP) computer, wherein all of the central processing units are generally identical, and use a common set or subset of instructions and protocols to operate. In the 60X series implementation of the PowerPC™ processor, tri-state drivers are used on several different buses to provide control signals between the central processing units. One such signal is the retry signal (ARTRY_), used as a common control signal for a variety of functions.

The ARTRY_ signal is an open drain signal (multiple devices can drive the same signal at the same time) but, due to the definition of its functionality and the high bus speeds involved, the communications architecture cannot rely upon resistive pull-up to restore these signals, i.e., from the active (asserted) state, to the inactive (negated) state. Therefore, in order to avoid bus contention when an attempt is made to simultaneously drive the signal by multiple devices, the 60× architecture defines the waveform of ARTRY_ as shown in FIG. 1A (the ratio of CPU clock to bus clock is 1 to 1 in this embodiment). When ARTRY_ is to be switched by a device from "0" to "1", it must be in the Hi-Z state before it can switch to "1". The specification further requires that each unit restore the signal to a high impedance state. Due to the different bus clock ratios and the restoring nature of this signal, the internal enable signal generally requires more levels of gating logic before it arrives at the input/output (I/O) driving cell, relative to the data path.

FIG. 2 shows a simplified schematic diagram that indicates how the prior art would typically implement the foregoing logic. Two signals, a latch output signal (artry_out) and an enable signal (artry_en) are used to control the output of an amplifier (driver) 1 which is connected to the ARTRY_bus. Signal artry en is generated by the gating logic 2 which is responsive to restoring logic. Signal artry_out is generated by a latch 3 which is set by internal control logic which detects any one of a defined set of conditions to which ARTRY_ must be asserted. The output of latch 3 is further provided as an internal signal (artry_out_internal) which is used for monitoring the detection of the ARTRY_ condition, and subsequent assertion of the external ARTRY_ signal, by the internal logic. The output of driver 1 is also connected to a receiver 4 whose output further provides an input signal (artry_in) which is used by the internal logic to detect an ARTRY_ assertion by some other external bus agent.

The 603 and 604 processors, as well as bridge chips such as the MPC105 and MPC106, all use structures similar to that shown in FIG. 2. This design, however, suffers a serious drawback relating to false switching. False switching can easily occur with devices that use open drain, complementary metal-oxide semiconducting (CMOS) drivers, particularly if there is imperfect synchronization of the multiple drivers attached to the bus. A timing delay is indicated in the timing diagram of FIG. 1B, wherein the foregoing approach is used, to give an example of a "glitch" occurring (the circled spike in FIG. 1B). As seen in FIG. 1B, if the enable signal (artry_en) has slightly more delay than the output signal (artry_out), then when ARTRY_ is switching from "0" to "Z", there is a short period of time it can go to "1". This condition may result in bus contention when multiple devices are switching the signal from active to Hi-Z, even though it may be just a very short period of time, effectively nullifying the benefits of a tri-state driver during such a condition.

A simple delay to the artry_out signal will not suffice to solve this problem. As seen in the timing diagram of FIG. 1C, if the artry_out signal is delayed, it merely shifts the spike when false switching occurs. It would, therefore, be desirable and advantageous to devise an improved tri-state driver for a multiple user bus which ensures that false switching does not result in bus contention.

SUMMARY OF THE INVENTION

It is therefore one object of the present invention to provide an improved bus contention circuit for a computer system.

It is another object of the present invention to provide such an improved bus contention circuit which uses a tri-state driver to generate microprocessor control signals.

It is yet another object of the present invention to provide such an improved bus contention circuit which ensures that false switching of CMOS devices in the drivers does not result in bus contention.

The foregoing objects are achieved in a method of avoiding contention on a communications bus using a tristate driver, generally comprising the steps of first switching the output signal of the tri-state driver from a first state (low) to a second state (Hi-Z) by asserting a first signal and negating a second signal, second switching the output signal from the second state (Hi-Z) to a third state (high) by asserting the second signal, third switching the output signal from the third state (high) to the second state (Hi-Z) by negating the second signal, and thereafter negating the first signal, and then fourth switching the output signal from the second state (Hi-Z) to the first state (low) by asserting the second signal. The step of negating the first signal preferably occurs at least one bus cycle before the fourth switching step, and within one bus cycle after the third switching step. This approach precludes the driver from accidentally switching to the high state when there is poor synchronization that delays the first signal with respect to the second signal.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 3:
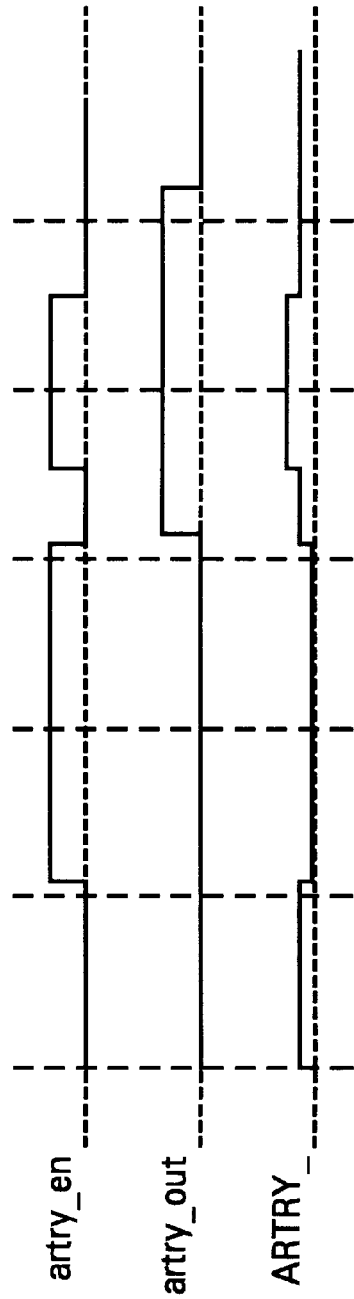
FIG. 3 is a timing diagram illustrating one implementation of a tri-state bus contention circuit constructed in accordance with the present invention.
Figure 2:
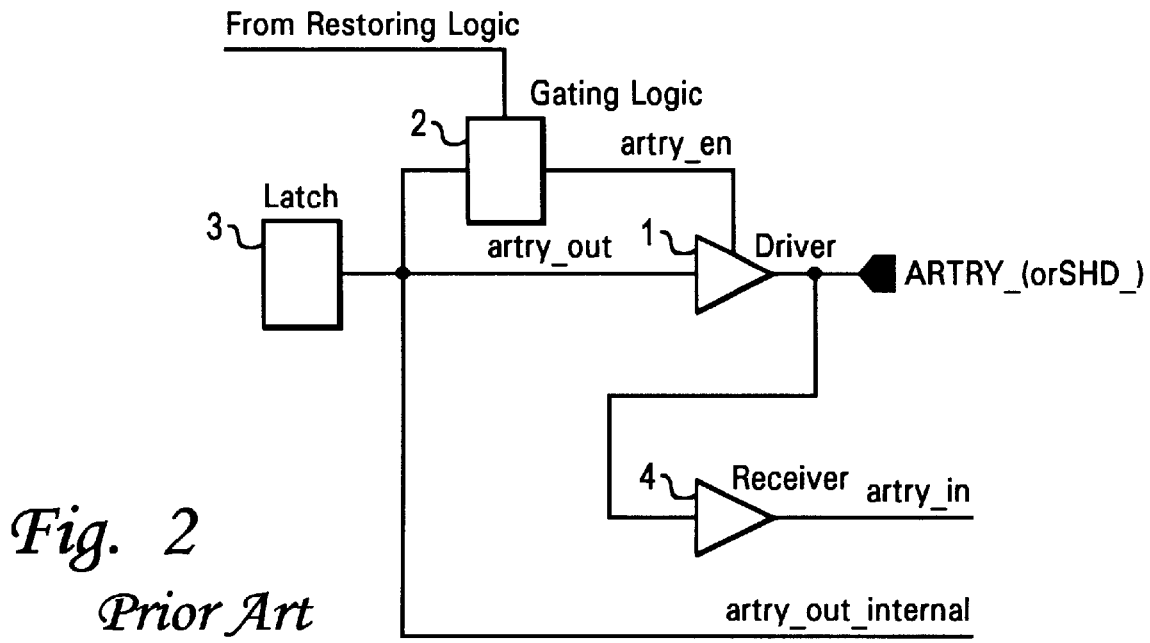
FIG. 2 is a schematic diagram of a conventional bus driver constructed to carry out the tri-state logic of FIG. 1A.

With reference now to the figures, and in particular with reference to FIG. 3, there is depicted a timing diagram illustrating one implementation of a tri-state bus contention circuit constructed in accordance with the present invention. Although the present invention may be applied to any sort of communications bus, it is particularly applicable to a bus for a high-speed computer system. In the depicted embodiment, the bus is used to assert a retry signal (ARTRY__) which can be utilized in conjunction with the PowerPC™ instruction set, but the present invention is not limited to this specific control signal.

Figure 1A:
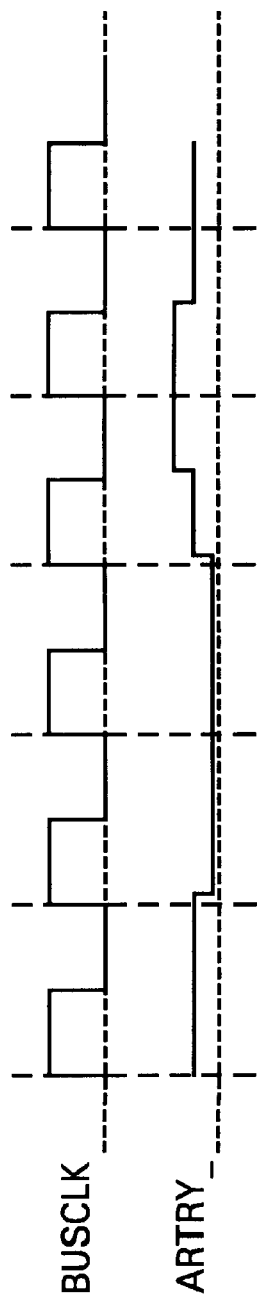
FIG. 1A is a timing diagram illustrating a control signal (ARTRY__) which is transmitted along a bus of a computer system, in accordance with conventional bus contention logic which uses tri-state drivers.
Figure 1B:
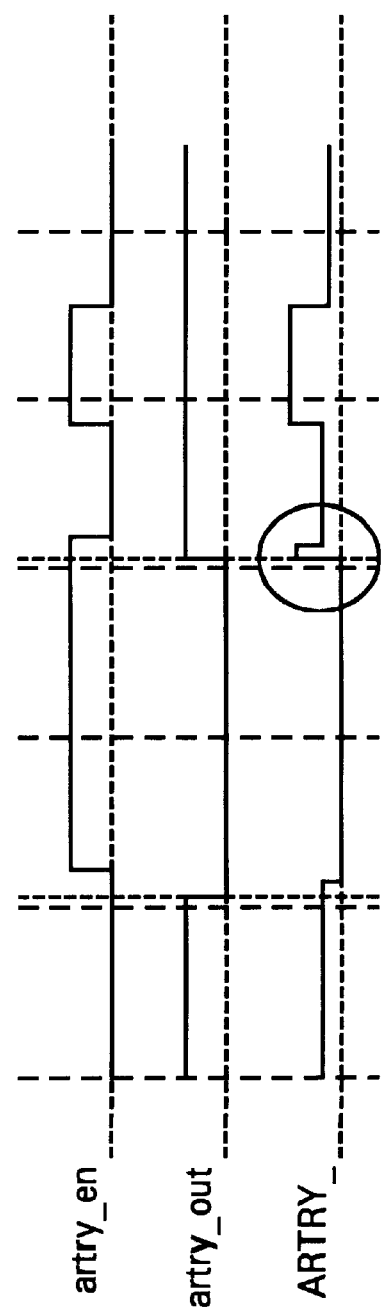
FIG. 1B is a timing diagram illustrating how the control signal (ARTRY__) of FIG. 1A can lead to bus contention as a result of false switching of CMOS devices used in the tri-state drivers.
Figure 1C:
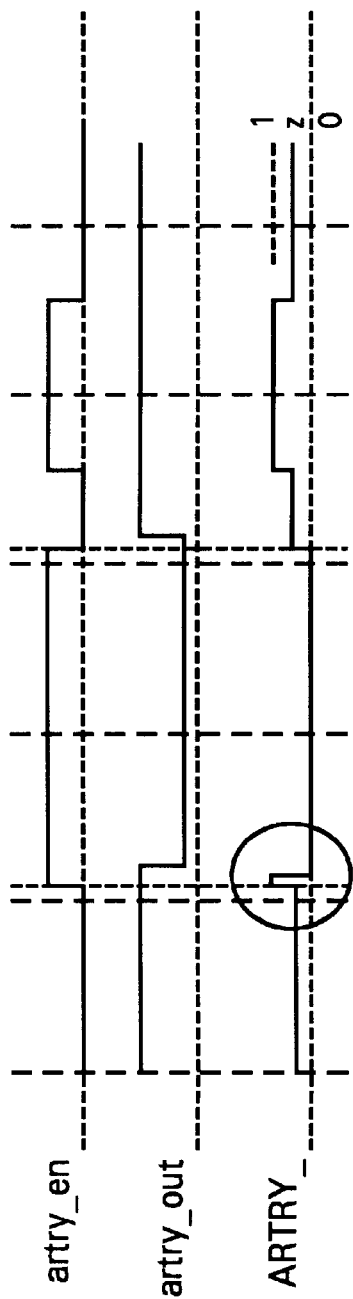
FIG. 1C is a timing diagram illustrating how the control signal (ARTRY__) of FIG. 1A can also lead to bus contention even if the driver's internally latched signal is delayed.

The present invention uses a tri-state driver that provides three different output levels: a low or unasserted state ("0"); a high or asserted state ("1"); and an intermediate, high-impedance state (Hi-Z). While these states are similar to the tri-state logic of FIG. 1A, the present invention uses these states in a different manner, to eliminate the chances of bus contention. In the depicted embodiment, the ARTRY__ signal is generated by a restore signal (artry__out) and an enable signal (artry__en). The primary difference between this logic and the prior art approach is that, in the present invention, the artry-out signal is asserted by default and it will be negated only at the restoring region, that is, at least one-half bus cycle before the artry__en signal is asserted to complete the restore of ARTRY__ up to the high state. This approach is acceptable since the artry__en signal is not asserted, so switching the artry__out state has no effect on ARTRY__. In contrast, the prior art latch 3 switched back the artry__out signal at the same general time that artry__en was asserted, because latch 3 is the primary source for both artry__out and artry__en (both signals transition in response to latch 3 transitioning).

Figure 4:
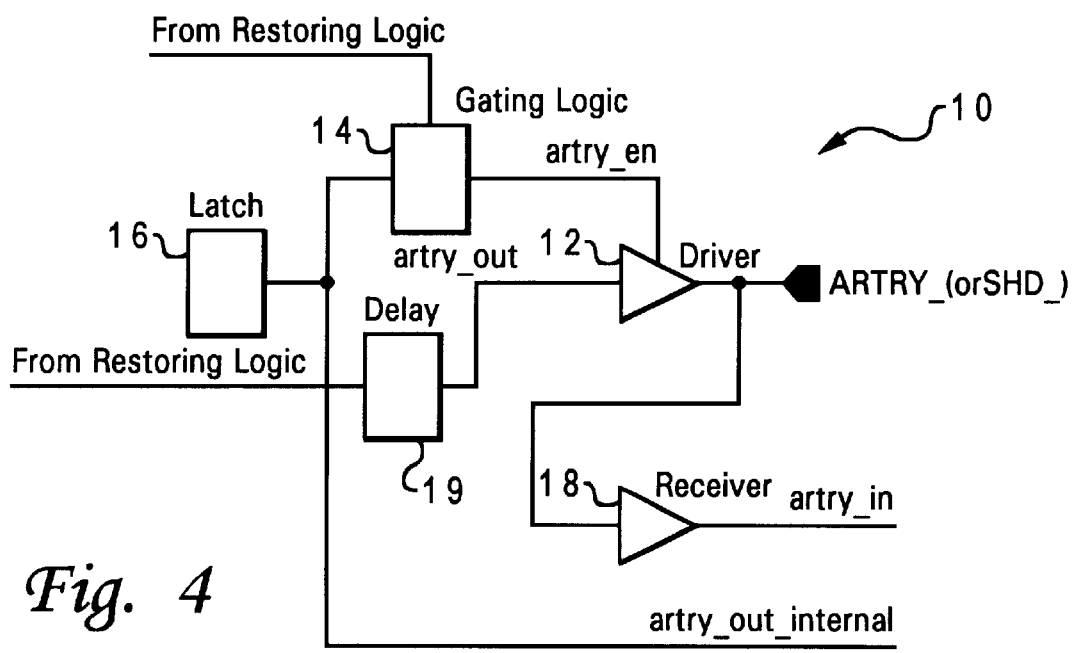
FIG. 4 is a schematic diagram of a tri-state bus contention circuit constructed in accordance with the present invention which may be used to carry out the contention logic of FIG. 3.

With further reference to FIG. 4, in one embodiment of a tri-state bus contention circuit 10 of the present invention used to implement the logic of FIG. 3, the signal artry__out and the signal artry__en are used to control the output of a driver 12 which is connected to the ARTRY__ bus. Signal artry__en is generated by gating logic 14 which is responsive to restoring logic, and to the state of a latch 16. Latch 16 is set by internal control logic which detects any one of a defined set of conditions to which ARTRY__ must be asserted. Signal artry__out is transmitted from the restoring logic as well, but is not derived in any way from the state of latch 16. The output of latch 16 is further provided as an internal signal (artry__out__internal) which is used for monitoring the detection of the ARTRY__ condition, and subsequent assertion of the external ARTRY__ signal, by the internal logic. The output of driver 12 is also connected to a receiver 18 whose output further provides an input signal (artry__in) which is used by the internal logic to detect an ARTRY__ assertion by some other external bus agent.

In this manner, the artry__out signal drops to the low state immediately after transmission of the retry signal, i.e., within about one to two bus cycles from the time ARTRY__ transitions from the asserted state to the Hi-Z state. This approach precludes the device from driving the high state on the bus when there is poor synchronization that delays artry__out with respect to artry__en. In fact, an extra delay 19 may be provided to ensure that ARTRY__ will not switch to the inactive state before artry__en is switched to the negated state.

Figure 5:
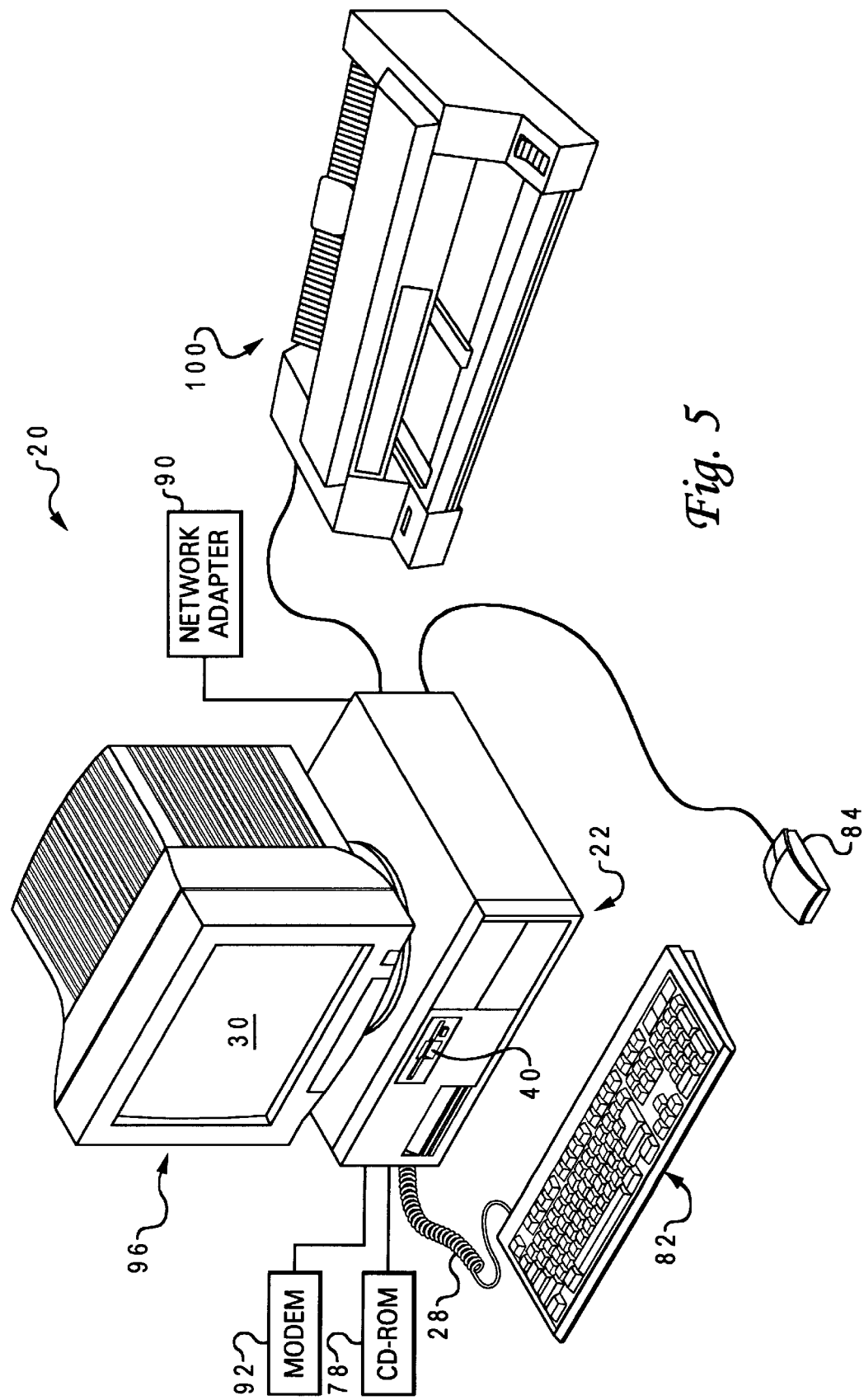
FIG. 5 is an illustration of one embodiment of a data processing system in which the present invention can be practiced.

With further reference to FIG. 5, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be implemented using any one of several known off-the-shelf components.

Figure 6:
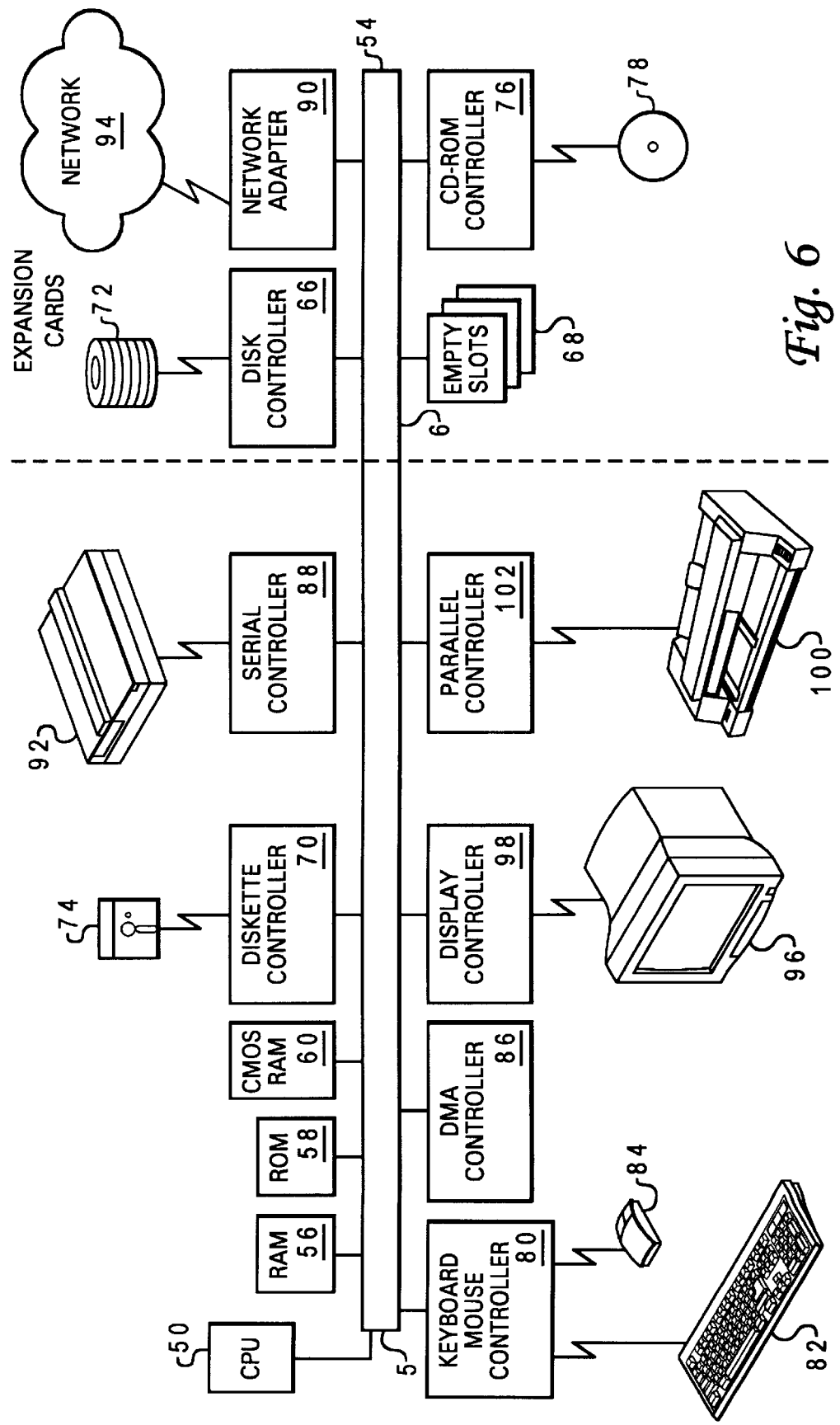
FIG. 6 is a high-level block diagram illustrating selected components that can be included in the data processing system of FIG. 5 according to the teachings of the present invention.

Reference now being made to FIG. 6, a high level block diagram is shown illustrating selected components that can be included in the data processing system 20 of FIG. 5 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 5, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. System bus 5 may be, but is not limited to, a processor bus or PCI (Peripheral Component Interconnect) Bus. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 5. Those skilled in the art will appreciate that a data processing system constructed in accordance with the present invention may have multiple components selected from the foregoing, including even multiple processors.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of avoiding contention on a communications bus using a tri-state driver, comprising the steps of:
   first switching an output signal of the tri-state driver from a first state to a second state by asserting a first signal and negating a second signal;
   second switching the output signal from the second state to a third state by asserting the second signal;
   third switching the output signal from the third state to the second state by negating the second signal;
   negating the first signal after said third switching step; and
   fourth switching the output signal from the second state to the first state by asserting the second signal.

2. The method of claim 1 wherein said step of negating the first signal occurs at least one bus cycle before said fourth switching step.

3. The method of claim 1 wherein said step of negating the first signal occurs within one bus cycle after said third switching step.

4. The method of claim 1 wherein said first switching step switches the output signal from a low voltage state to a high-impedance state.

5. The method of claim 1 wherein said second switching step switches the output signal from a high-impedance state to a high-voltage state.

6. The method of claim 1 wherein said third switching step switches the output signal from a high-voltage state to a high-impedance state.

7. The method of claim 1 wherein said fourth switching step switches the output signal from a high-impedance state to a low-voltage state.

8. The method of claim 2 wherein said step of negating the first signal further occurs within one bus cycle after said third switching step.

9. An apparatus for gating an open drain driver connected to a bus having multiple users, the apparatus comprising:
   restoring logic providing a first logic signal and a second logic signal;
   an input gate which is asserted to an active level in response to said first logic signal;
   gating logic conditionally enabling said input gate in response to said second signal; and
   means for switching said first and second signals between asserted and negated states, said switching means including means for negating said first signal during a restoring region of a driver cycle.

10. The apparatus of claim 9 wherein said input gate provides a low-voltage state, a high-impedance state, and a high-voltage state.

11. The apparatus of claim 9 wherein said first logic signal is delayed with respect to said second logic signal.

* * * * *